US009539869B2

(12) United States Patent
Hinque et al.

(10) Patent No.: US 9,539,869 B2
(45) Date of Patent: Jan. 10, 2017

(54) SELF-INFLATING TIRE AND PRESSURE REGULATOR (71) Applicant: The Goodyear Tire & Rubber Company, Akron, OH (US)

(72) Inventors: Daniel Paul Luc Marie Hinque, Habay-la-Neuve (BE); Jeannot Frieden, Uebersyren (LU); Anne Therese Peronnet-Paquin, Luxembourg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 115 days.

(21) Appl. No.: 14/546,490

(22) Filed: Nov. 18, 2014

(65) Prior Publication Data
US 2015/0158353 A1 Jun. 11, 2015

Related U.S. Application Data (60) Provisional application No. 61/914,630, filed on Dec. 11, 2013.

(51) Int. Cl.
*B60C 23/12* (2006.01)
(52) U.S. Cl.
CPC ........ *B60C 23/12* (2013.01); *Y10T 152/10495* (2015.01)
(58) Field of Classification Search
CPC ......... B60C 23/12; B60C 23/001; B60C 29/04
See application file for complete search history.

(56) References Cited

U.S. PATENT DOCUMENTS

| 638,628 A | 12/1899 | Everett et al. |
| 1,050,886 A | 1/1913 | Wetherell |
| 1,134,361 A | 4/1915 | Wetherell |
| 2,095,489 A | 9/1935 | Cotton |
| 3,304,981 A | 2/1967 | Sheppard |
| 4,570,691 A * | 2/1986 | Martus ..................... B60O 5/24 137/223 |
| 4,651,792 A * | 3/1987 | Taylor ..................... B60C 23/12 141/198 |
| 7,225,845 B2 | 6/2007 | Ellmann |
| 8,042,586 B2 | 10/2011 | Losey et al. |
| 8,113,254 B2 | 2/2012 | Benedict |
| 8,156,978 B1 | 4/2012 | Hinque et al. |

(Continued)

FOREIGN PATENT DOCUMENTS

| AU | 1612276 A | 1/1978 |
| DE | 102005031099 A1 | 1/2007 |

(Continued)

OTHER PUBLICATIONS

European Search Report for EP14196687.

*Primary Examiner* — Kip T Kotter
(74) *Attorney, Agent, or Firm* — June E. Rickey (57) ABSTRACT A self-inflating tire assembly includes an air tube connected to a tire and defining an air passageway, the air tube being composed of a flexible material operative to allow an air tube segment opposite a tire footprint to flatten, closing the passageway, and resiliently unflatten into an original configuration. The air tube is sequentially flattened by the tire footprint in a direction opposite to a tire direction of rotation to pump air along the passageway to a inlet control valve. The inlet control valve regulates the inlet air flow to the air tube and the outlet air flow to the tire cavity.

13 Claims, 14 Drawing Sheets (56) References Cited

U.S. PATENT DOCUMENTS

| | | |
|---|---|---|
| 8,235,081 B2 | 8/2012 | Delgado et al. |
| 8,291,950 B2 | 10/2012 | Hinque et al. |
| 8,573,270 B2 | 11/2013 | Hinque |
| 8,857,484 B2 | 10/2014 | Hinque |
| 2004/0112495 A1 | 6/2004 | Weise |
| 2011/0120611 A1 | 5/2011 | Hansen |
| 2012/0160386 A1 | 6/2012 | Hinque et al. |
| 2012/0241063 A1 | 9/2012 | Hinque et al. |
| 2012/0241064 A1 | 9/2012 | Hinque et al. |
| 2013/0048176 A1* | 2/2013 | Hinque .................. B60C 23/12 152/450 |
| 2013/0048177 A1* | 2/2013 | Hinque .................. B60C 23/12 152/450 |
| 2013/0048178 A1 | 2/2013 | Hinque |
| 2013/0112328 A1 | 5/2013 | Hinque et al. |
| 2013/0112329 A1 | 5/2013 | Hinque et al. |
| 2013/0160917 A1 | 6/2013 | Hinque et al. |

FOREIGN PATENT DOCUMENTS

| | | |
|---|---|---|
| EP | 1604842 A1 | 12/2005 |
| EP | 2881269 A1 | 6/2015 |
| FR | 2138747 | 2/1977 |
| WO | 2007134556 | 11/2007 |

\* cited by examiner

SELF-INFLATING TIRE AND PRESSURE REGULATOR

FIELD OF THE INVENTION

The invention relates generally to self-inflating tires and, more specifically, to a pump mechanism and pressure regulator for such tires.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependent upon the driver taking remedial action when warned to re-inflate a tire to recommended pressure. It is a desirable, therefore, to incorporate a self-inflating feature within a tire that will self-inflate the tire in order to compensate for any reduction in tire pressure over time without the need for driver intervention.

SUMMARY OF THE INVENTION

The invention provides in a first aspect a self-inflating tire assembly, including a tire mounted to a rim, the tire having a tire cavity, first and second sidewalls extending respectively from first and second tire bead regions to a tire tread region; an air passageway having an inlet end and an outlet end, the air passageway being composed of a flexible material operative to open and close when the tire rotates, wherein the outlet end is in fluid communication with the tire cavity; the inlet control valve having a regulator body having an interior chamber; a pressure membrane being mounted on the inlet control valve to enclose the interior chamber, wherein the pressure membrane has a lower surface that is positioned to open and close the outlet port mounted in the interior chamber, wherein the pressure membrane is in fluid communication with the tire cavity pressure; wherein the body of the inlet control valve has a first and second flexible duct, wherein said first and second flexible ducts each have an internal passageway; wherein the first flexible duct has a first end connected to an inlet filter assembly and a second end is connected to the interior chamber of the inlet control valve, wherein the second flexible duct has a first end connected to the outlet port of the inlet control valve, and a second end in fluid communication with the inlet end of the air passageway.

Definitions

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of a surface, perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

Figure 1:
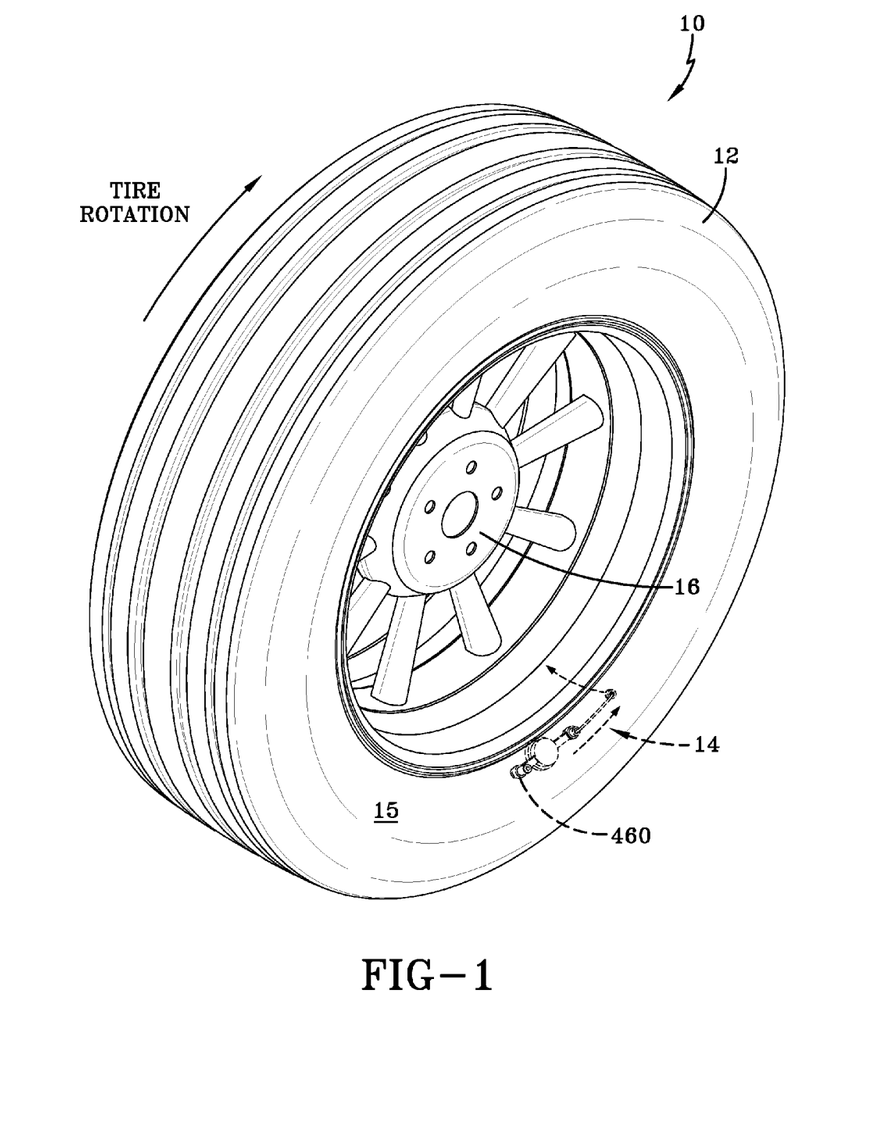
FIG. 1 is an isometric view of tire and rim assembly showing a pump and regulator assembly.
Figure 2:
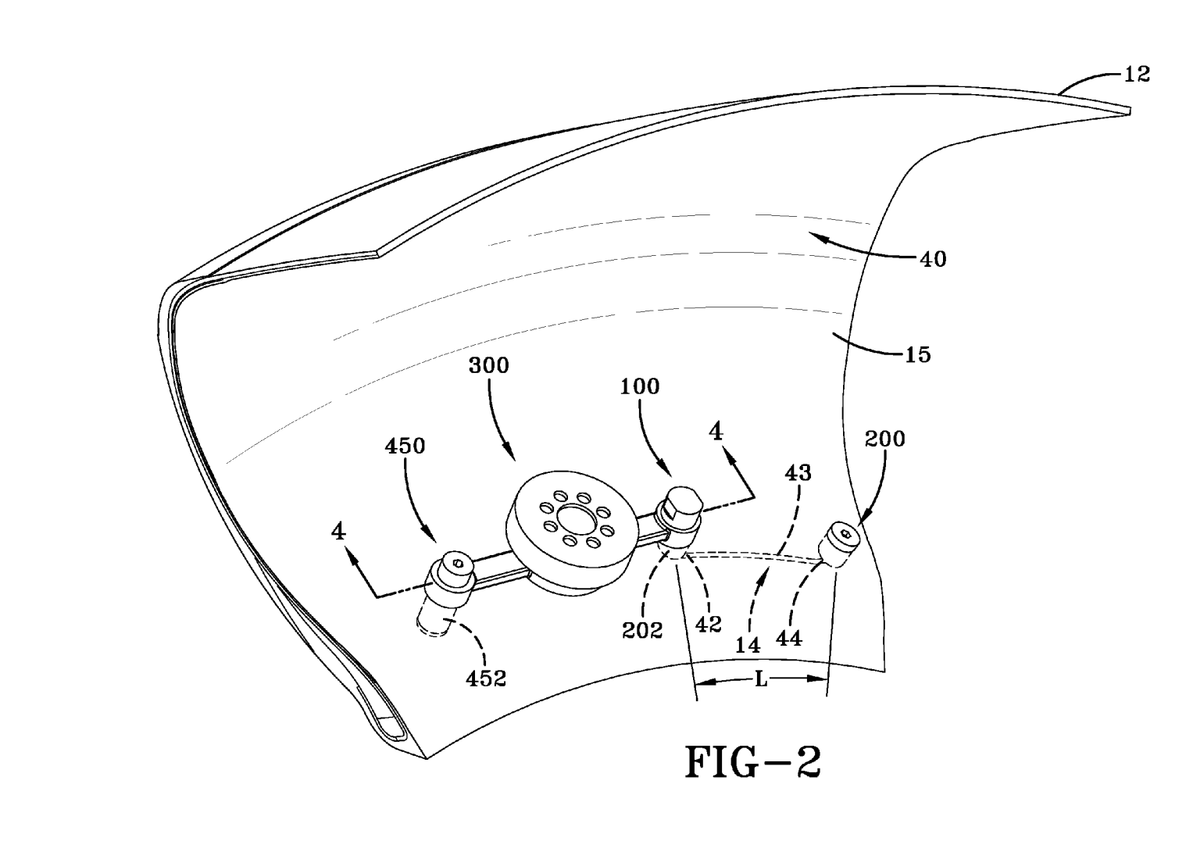
FIG. 2 is a front view of the pump and regulator assembly as shown from inside the tire of FIG. 1.

Referring to FIGS. 1 and 2, a tire assembly 10 includes a tire 12, a pump assembly 14, and a tire rim 16. The tire and rim enclose a tire cavity 40. As shown in FIGS. 1-2, the pump assembly 14 is preferably mounted into the sidewall area 15 of the tire, preferably near the bead region.

Pump Assembly 14

Figure 10:
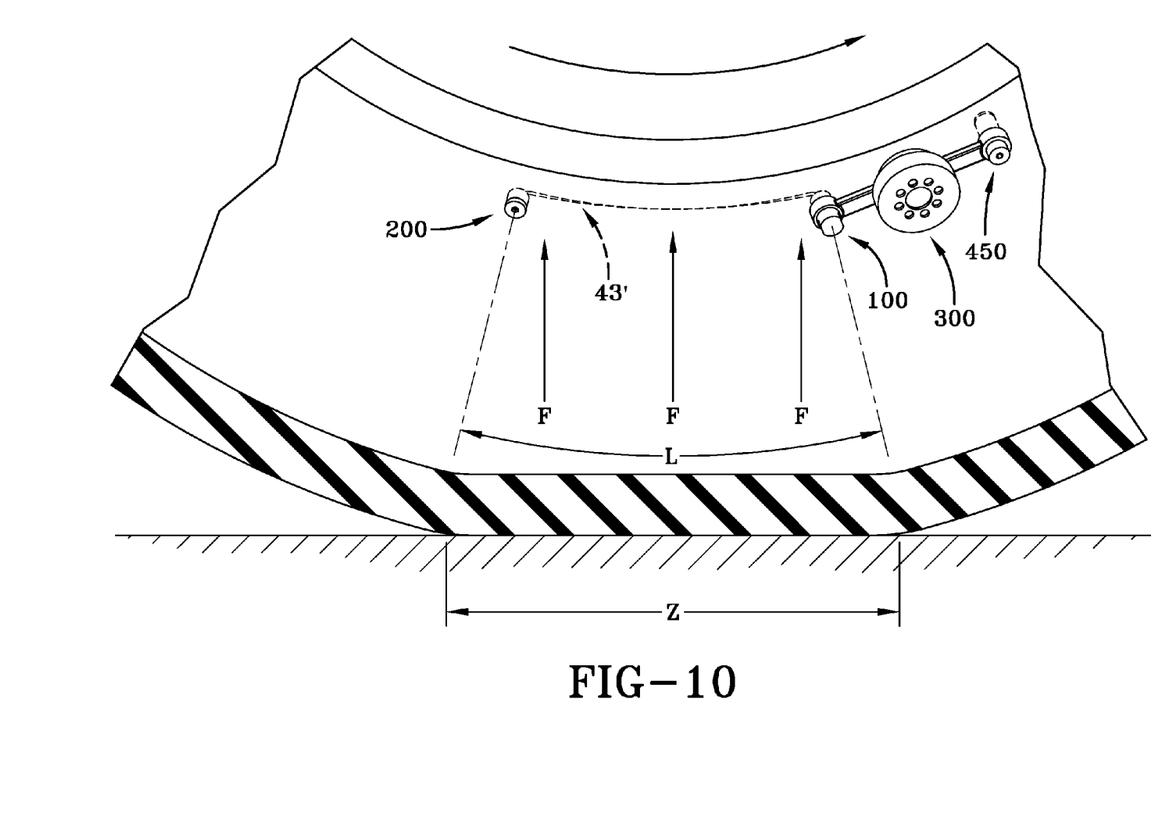
FIG. 10 is a view from inside the tire during operation.

The pump assembly 14 includes an air passageway 43 which may be molded into the sidewall of the tire during vulcanization or formed post cure. When the air passageway is molded into the tire sidewall as shown in FIG. 2, the air passageway has an arc length L as measured by an angle $\Psi$ that is measured from the center of rotation of the tire. In a first embodiment, the angle $\Psi$ may range, and is preferably in the range of about 15-50 degrees or optionally, an angular length sufficient to extend the length of the tire footprint Z, as shown in FIG. 10. The air passageway has an arc length L that may extend in a circumferential direction, or any direction. The arc length L of the air passageway 43' may range, and is preferably about the length of the tire footprint Z, as shown in FIG. 10. The length is typically about 20-40 degrees when the shorter length is used. More preferably, the length of the air passageway is in the range of about 10 to about 30 degrees. Alternatively, the pump tube length may be any desired length, typically 10 degrees or more. The pump air passageway 43 is comprised of a tube body formed of a resilient, flexible material such as plastic, elastomer or rubber compounds, and is capable of withstanding repeated deformation cycles when the tube is deformed into a flattened condition subject to external force and, upon removal of such force, returns to an original condition generally circular in cross-section. The tube is of a diameter sufficient to operatively pass a volume of air sufficient for the purposes described herein and allowing a positioning of the tube in an operable location within the tire assembly as will be described. Preferably, the tube has a circular cross-sectional shape, although other shapes such as elliptical may be utilized. The tube may be a discrete tube that is inserted into the tire during tire manufacturing, or the tube may be molded into shape by the presence of a removable strip that forms the passageway when removed.

As shown in FIG. 2, the pump passageway 43 has an inlet end 42 connected to an inlet fitting 100, and an outlet end 44 that is connected to an outlet valve 200. The inlet fitting 100 is in fluid communication with an inlet control valve 300. The inlet control valve 300 is in fluid communication with an inlet filter assembly 450.

Inlet Control Valve

A first embodiment of an inlet control valve 300 is shown in FIGS. 2-5. The inlet control valve 300 functions to regulate the flow of air to the pump 14. The inlet control valve 300 has a central housing 310 that houses an interior chamber 320. The interior chamber 320 has a central opening 312. Opposite the central opening 312 is an outlet port 330. The outlet port is raised from the bottom surface 313 and extends into the interior of the chamber 320. The outlet port is positioned to engage a pressure membrane 550.

Figure 3:
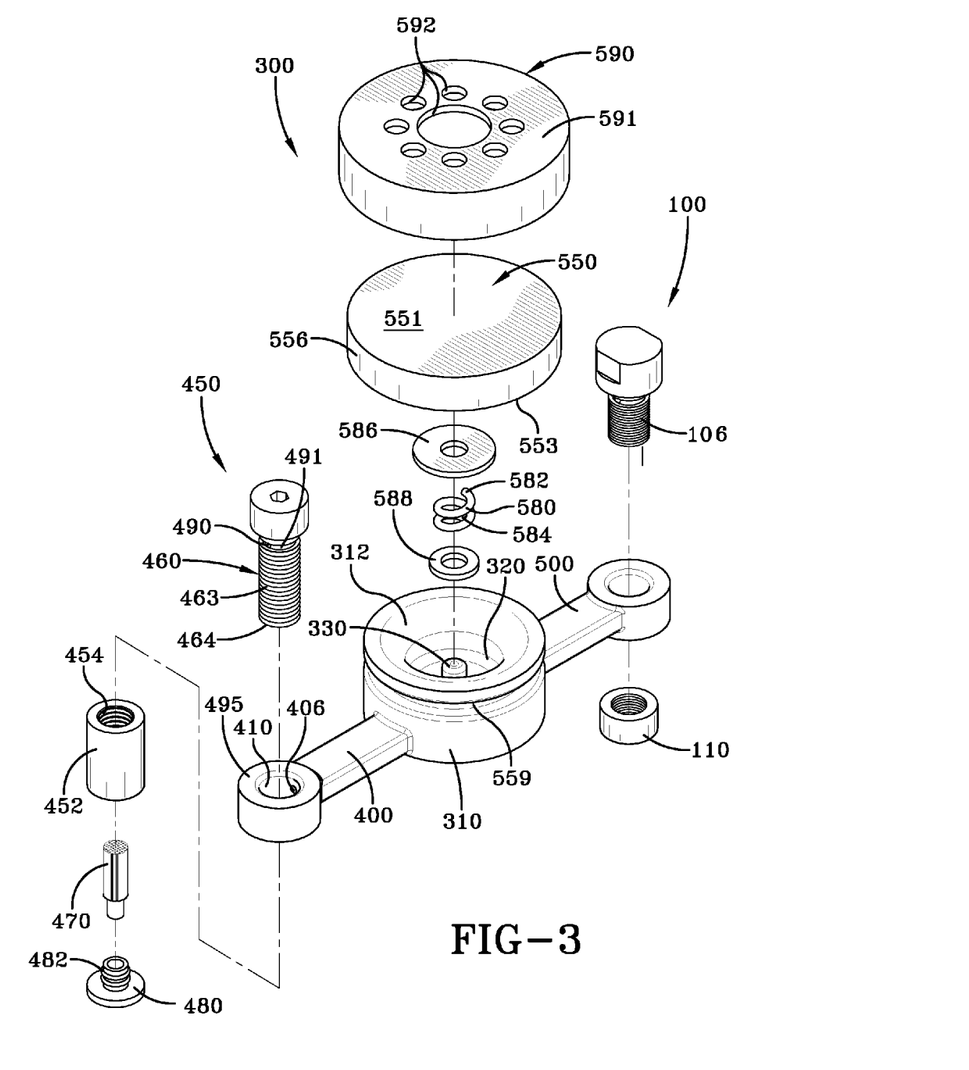
FIG. 3 is an exploded view of the regulator assembly.
Figure 4:
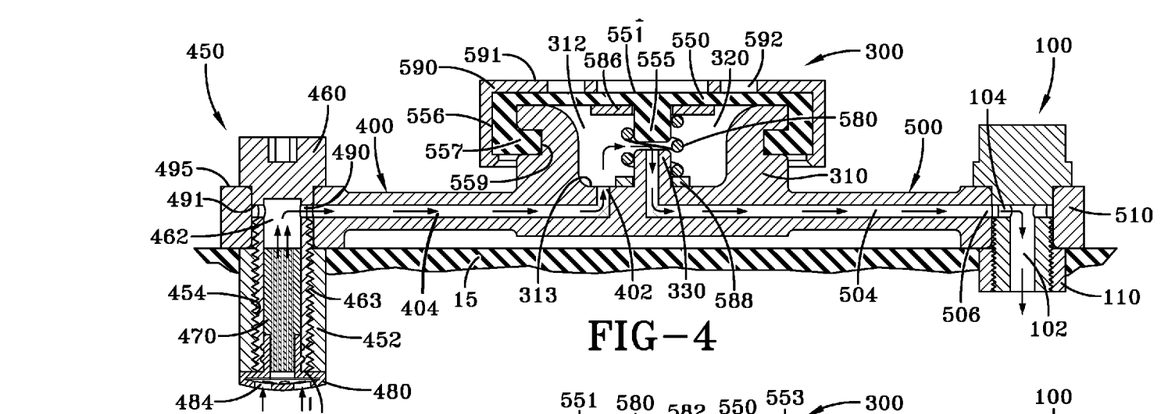
FIG. 4 is a section view of FIG. 2 in the direction 4-4 showing the regulator in the open position during operation.
Figure 5:
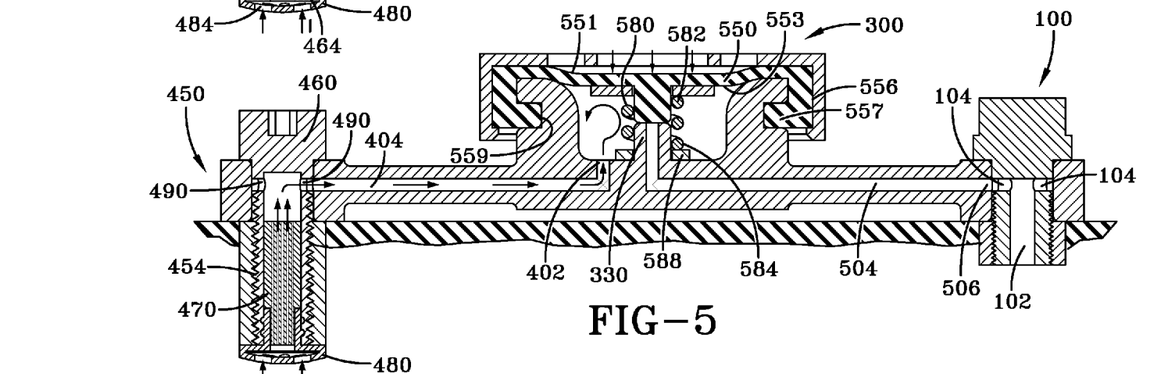
FIG. 5 is a section view of FIG. 2 in the direction 4-4 showing the regulator in the closed position during operation.
Figure 6:
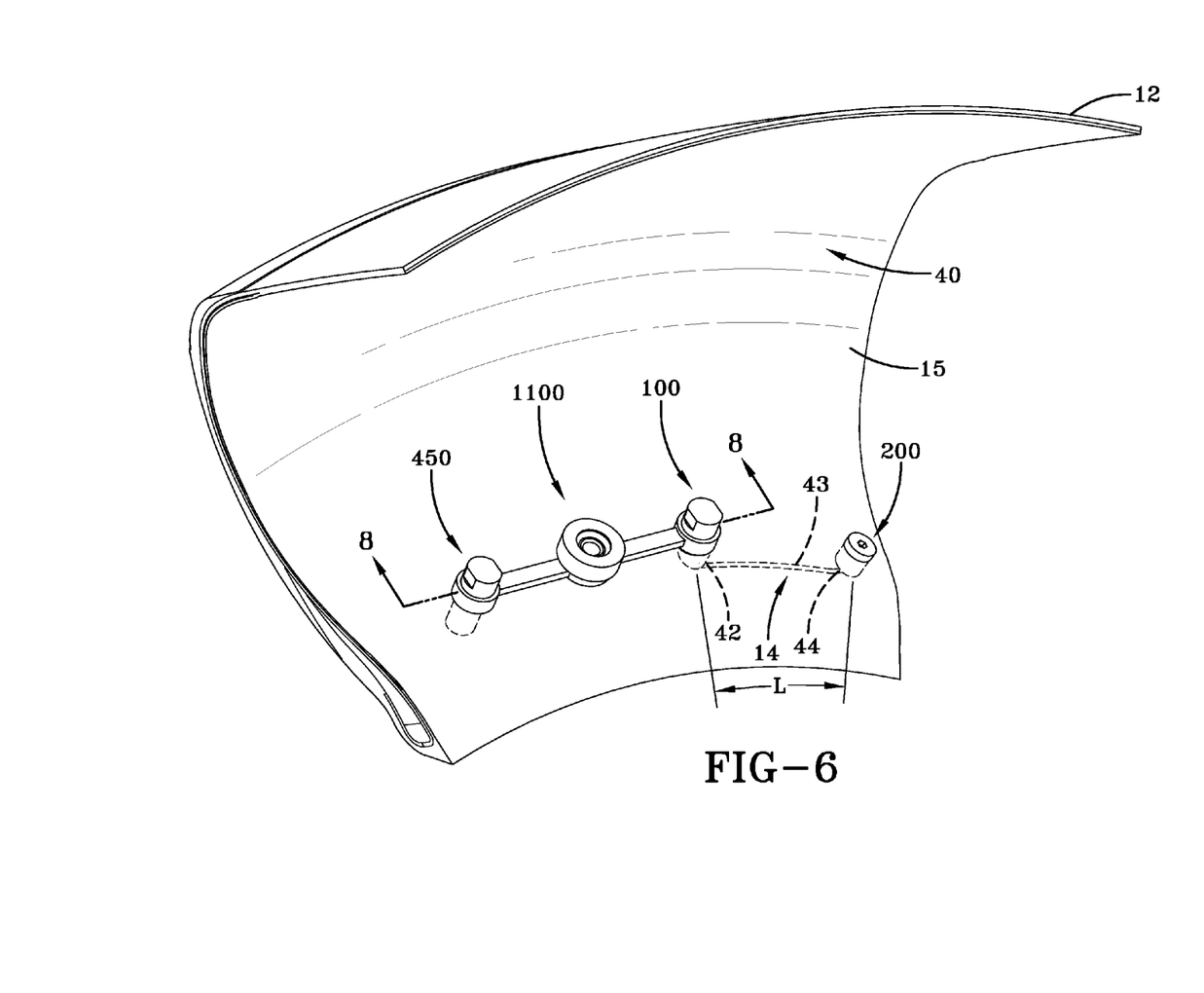
FIG. 6 is a front view of a second embodiment of a regulator assembly as shown from inside the tire of FIG. 1.
Figure 7:
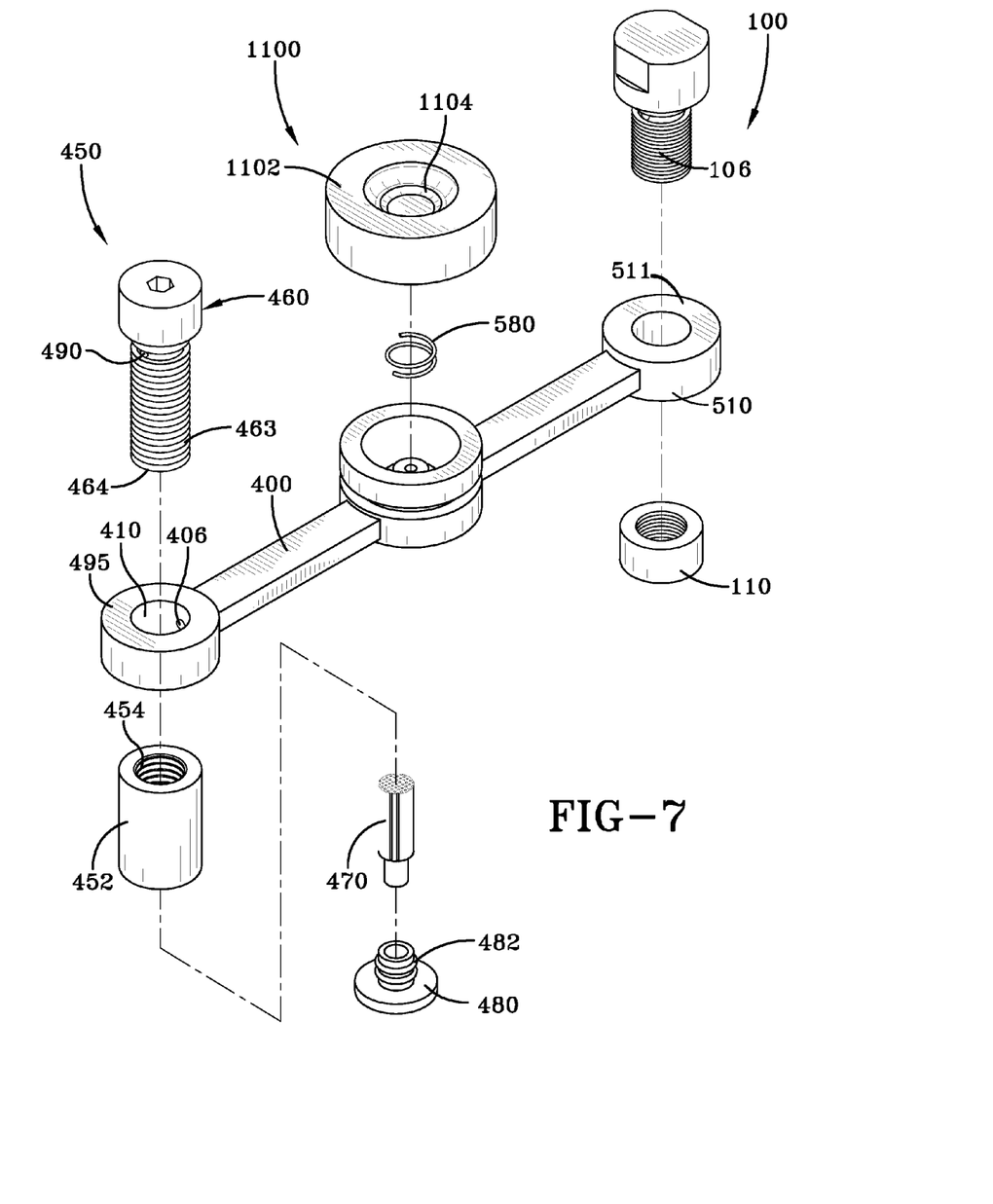
FIG. 7 is an exploded view of the second embodiment of the regulator assembly.

The pressure membrane has an upper surface 551 that is substantially planar. The pressure membrane has a lower surface 553 wherein a plug 555 extends from the lower surface. The pressure membrane further has an annular sidewall 556 which extends downwardly from the upper surface, forming a lip 557. The lip 557 is preferably annular, and snaps in an annular cutout 559 formed on the outer housing 310. The pressure membrane is a disk shaped member made of a flexible material such as, but not limited to, rubber, elastomer, plastic or silicone. The outer surface 551 of the pressure membrane is in fluid communication with the pressure of the tire chamber 40. The lower surface 553 of the pressure membrane is in fluid communication with the interior chamber 320. The plug 555 is positioned to close the outlet port 330. A spring 580 is positioned in the interior chamber 320 to bias the pressure membrane 550 in the open position. The spring has a first end 582 that is received about the plug 555. The spring has a second end 584 that is wrapped around the outer surface of the outlet port 330. A first washer 586 may be received between the spring first end 582 and the pressure membrane 550. A second washer 588 may be received between the spring second end 584 and the bottom of the chamber 313. Thus the balance of pressure forces on each side of the pressure membrane actuates the pressure membrane plug 555 to open and close the outlet port 330. A membrane support member 590 is received over the pressure membrane 550. The membrane support member 590 has a plurality of holes 592 in the outer surface 591 of the lid, to allow the pressure membrane to be in fluid communication with the tire cavity 40. The membrane support member 590 is formed of a rigid material, and the support member allows a preloading of the spring via the pressure membrane.

Extending from the central housing 310 is a first and second flexible duct 400, 500, positioned on either side of the central housing 310. Each flexible duct 400, 500 may be integrally formed with the central housing as shown, or be a discrete part connected to the central housing 310. Each flexible duct 400, 500 has an internal passageway 404, 504 for communicating fluid.

The internal passageway 404 of the first flexible duct 400 has a first opening 402 that is located inside the interior chamber 320. The internal passageway 404 of the first flexible duct 400 has a second end 406 that is in fluid communication with an inlet filter assembly 450. The inlet device 450 supplies outside filtered air to the regulator via the first flexible duct 400, and is described in more detail below.

The internal passageway 504 of the second flexible duct 500 is shown integrally formed with the outlet port 330 of the interior chamber 320. The internal passageway 504 has a second end 506 in fluid communication with an inlet fitting 100. The outer end 511 of the second flexible duct 500 terminates in a circular flange 510. The inlet fitting 100 may be a hollow screw such as a banjo screw. The inlet fitting 100 has an internal passageway 102 with inlet holes 104 that communicate flow to the inlet 42 of the pump passageway 43. The inlet fitting 100 may comprise a screw with an internal passageway, and has an outer threaded surface 106 that is received in a sleeve 110. The sleeve 110 has a bore that extends completely therethrough. The sleeve is mounted in the tire.

Figure 8:
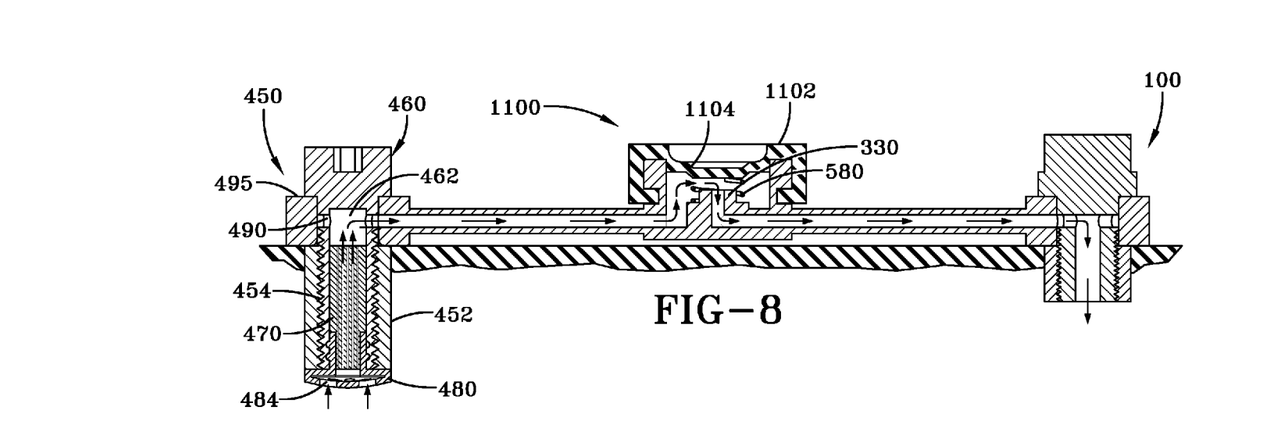
FIG. 8 is a section view of FIG. 6 in the direction 8-8 showing the regulator in the open position during operation.
Figure 8A:
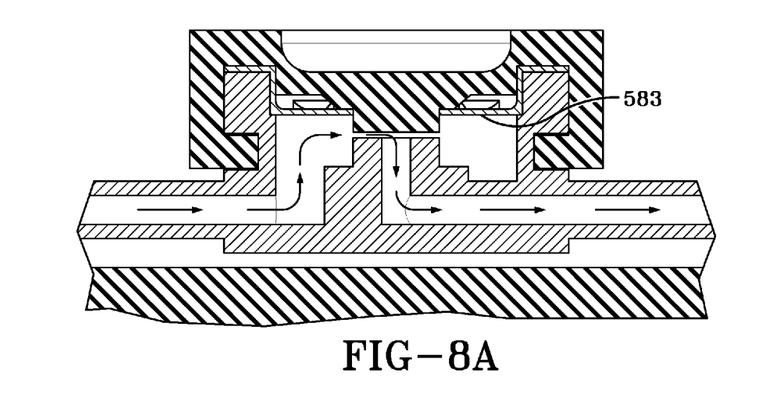
FIG. 8a is the same as FIG. 8, except that the coil spring has been replaced with a leaf spring.

A second embodiment of the inlet control valve 1100 is shown in FIGS. 6-9. The inlet control valve 1100 is the same as 300 except for the following differences. The membrane 1102 does not have a plug 555 on the lower surface. The membrane has a non-planar upper surface with a recessed interior portion 1104. The recessed interior portion extends into the interior of the interior chamber and is positioned to open and close the outlet passageway 330. A coil spring 580 is positioned to bias the pressure membrane in the open position. The coil spring 580 may be replaced with a leaf spring 583 as shown in FIG. 8A.

Inlet Filter Assembly

The inlet filter assembly 450 is shown in FIG. 4. The inlet filter assembly 450 includes an insert sleeve 452 that is hollow and has an internal threaded bore 454. The insert sleeve 452 is inserted into the tire, typically in the sidewall 15. The insert sleeve 452 may be inserted into the tire post cure or may be molded into the tire as shown in FIG. 2. An air passage screw 460 has an outer threaded body 463 that is screwed into the internal threaded bore 454 of the insert sleeve. The air passage screw 460 has an internal passageway 462 having an opening 464. A filter 470 is inserted through opening 464 and is received in the internal passageway 462. A filter cap 480 has a threaded end 482 that is received in the opening 464 of the air passage screw 460. The filter cap is positioned on the outside surface of the tire, typically on the tire sidewall as shown in FIG. 1. The filter cap has a plurality of holes 484 for allowing the flow of air into the inlet filter 470. Outside air enters hole 484 and then through the filter cap into and through filter 470. The filter air exits the filter 470 into the internal passageway 462 of the air passage screw 460. The air exits the internal passageway 462 through exit hole 490 and then into the inlet end 406 of the first flexible duct 400. The inlet end of the flexible duct 400 has a circular flange 495 surrounding a hole 410 through which the air passage screw is inserted. The exit hole 490 is located in a circumferential groove 491 to facilitate fluid communication with inlet hole 406 of the first flexible duct 400. The circular flange 495 functions like a sealing gasket if it is made of a flexible soft material like rubber.

Pump Outlet Check Valve

As described above, a first end 42 of the pump is connected to a regulator and a check valve. The second end 44 of the pump is connected to a pump outlet valve 200. The pump outlet valve is shown in FIGS. 11, 12A-C. The pump outlet valve 200 includes an insert sleeve 202 that is inserted into the tire on an interior surface, typically the inner sidewall as shown in FIG. 2. The insert sleeve 202 has an internal threaded bore 204. The insert sleeve 202 may be molded into the tire 12 or inserted post cure. The insert is installed in the tire area so that the internal bore 204 is in fluid communication with the pump outlet end 44. A valve body 210 has an outer threaded surface 212 that is received within insert 202. The valve body 210 has a central passage 215 that has a first opening 218 that is in fluid communication with the insert sleeve bore 204 and the pump passageway 43 outlet end 44 when inserted into the tire. The central passage 215 has an outlet end 217 that is in fluid communication with the tire cavity. The valve body has a shaped head 222 such as a hexagonal shaped head bore 223 for receiving a mating tool such as an allen wrench useful for tightening the valve body 210 inside the sleeve 202. The central passage 215 further includes a retainer slot 230 for receiving flexible stopper 240. The flexible stopper 240 is preferably made of a resilient material such as rubber, silicone, or an elastomer. The flexible stopper 240 has a disk shaped lower end 242, and two opposed legs 244 which extend from the lower end 242. Each leg 244 has a shoe 250 which has a curved enlarged shape and is made of a resilient material. As shown, the shoe is a semi-circle, although other shapes would work for the invention. Although the flexible stopper 240 is shown with two legs 244, the stopper could have a single leg 244 with a shoe thereon, and the shoe could be annular with holes that allow passage of air therethrough.

Figure 11:
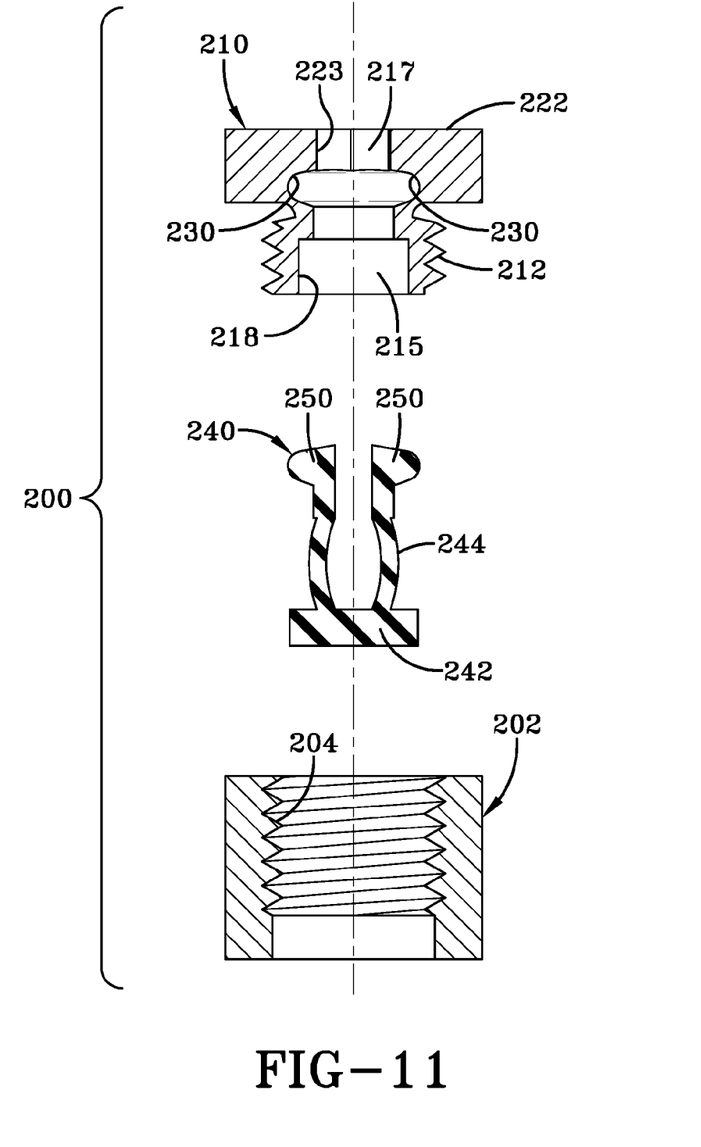
FIG. 11 is an exploded view of a pump outlet valve.

The flexible stopper is mounted inside the central passage so that each shoe 250 of the flexible stopper is received in the annular retainer slot 230, and the disk lower end 242 is positioned to open and close the pump end 44.

Figure 12A:
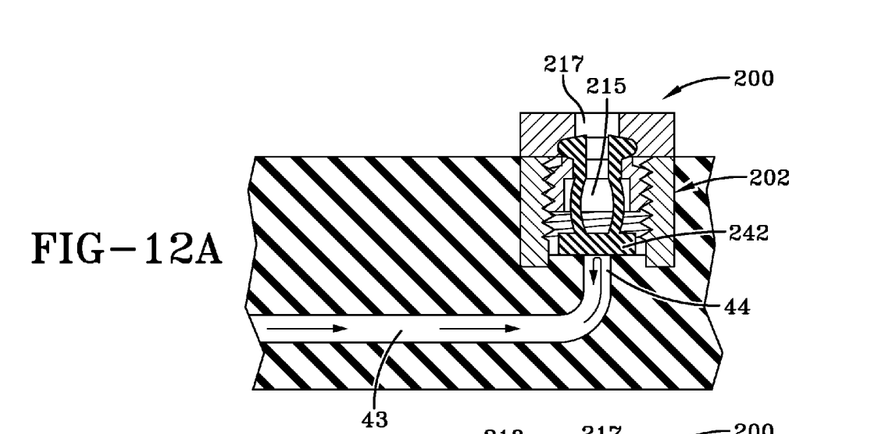
FIG. 12a is a cross-sectional view of the pump outlet valve in the closed position.
Figure 12B:
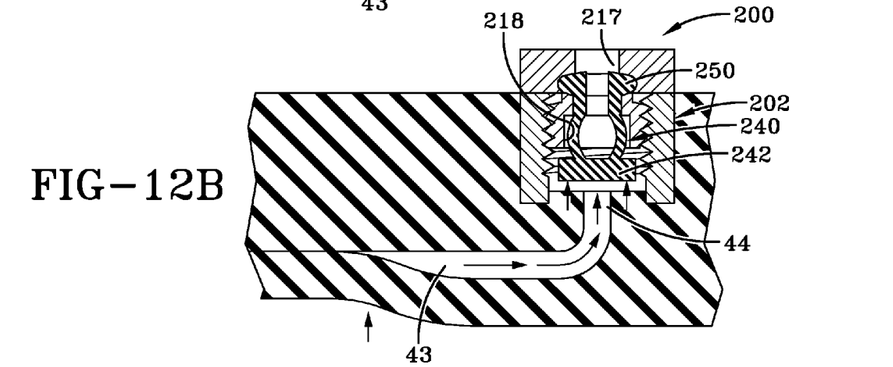
FIG. 12b is a cross-sectional view of the pump outlet valve during the cracking open position.
Figure 12C:
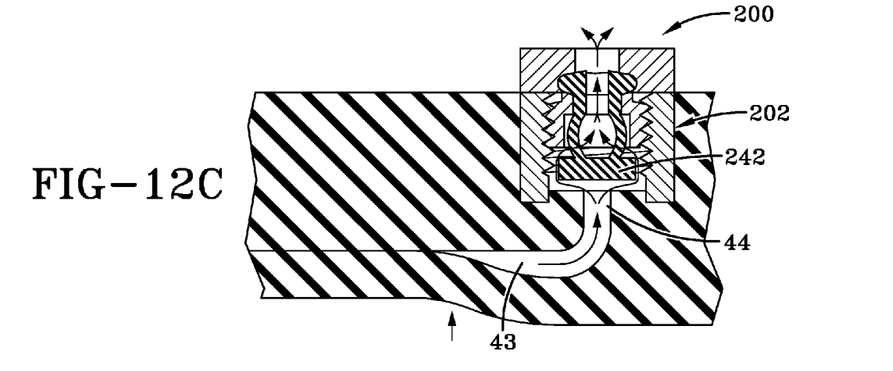
FIG. 12c is a cross-sectional view of the pump outlet valve in the open position.

FIGS. 12A-C illustrate the pump outlet valve 200 installed and operational. FIG. 12C illustrates flow from the pump outlet 44 to the pump outlet valve 200. The disk lower end 242 of the flexible stopper 240 does not seal the pump outlet 44 when the flow direction is towards the pump outlet valve 200. The flow travels through the central passage 215, around and through the legs 244 and exits the passage outlet 217 to the tire cavity. FIG. 12A illustrates the disk lower end 142 of the flexible stopper 140 sealing the pump end 44 so that flow is blocked from flowing to the tire cavity 40. FIG. 12B illustrates the disk lower end 142 of the flexible stopper 140 being lifted by the valve cracking pressure when the pump starts pumping.

An additional check valve like the check valve 200 may be optionally used between the pump inlet passageway 42 and the outlet of the regulator.

System Operation

As will be appreciated from FIG. 2, the inlet control valve 300 is in fluid communication with the inlet end of the pump passageway 43. As shown in FIG. 10, as the tire rotates, a footprint is formed against the ground surface. A compressive force F is directed into the tire from the footprint and acts to flatten the pump passageway 43. Flattening of the pump passageway 43 forces the compressed air towards the pump outlet device 200. Due to the increase in pressure at the pump outlet 44, the pressure unseats the disk 242 from the opening of the pump outlet 44, which allows the pumped air to exit the pump outlet device through passage 215 into the tire cavity 40, as shown in FIG. 12C.

The inlet control valve 300 controls the flow of outside air into the pump. If the tire pressure is low, the membrane 550 in the inlet control valve 300 is responsive to the tire pressure in the tire cavity 40. If the tire cavity pressure falls below a preset threshold value, the plug of the membrane will unseat from the central outlet port 330. Outside air will enter the filter assembly 450, exit through the filter and enter the first flexible duct 400, as shown in FIGS. 4 and 8. The flow then exits the first flexible duct and enters the chamber and then into the second flexible duct, through the inlet fitting 100 and then into the pump inlet. The flow is then compressed through the pump and then exits the pump outlet valve into the tire cavity. The pump will pump air with each tire rotation. The pump passageway 43 fills with air when the pump system is not in the footprint.

Figure 9:
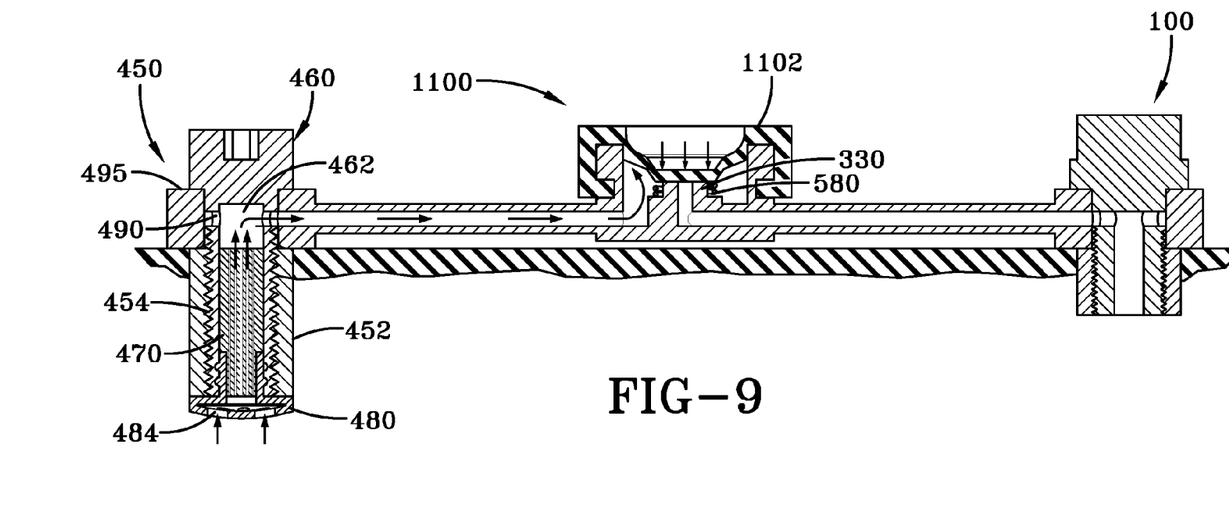
FIG. 9 is a section view of FIG. 6 in the direction 8-8 showing the regulator in the closed position during operation.

If the tire pressure is sufficient, the inlet control valve will block flow from exiting the inlet control valve, as shown in FIGS. 5 and 9. The pressure membrane is responsive to the cavity tire pressure and engages the central port 330 forming a seal which prevents air flow from passing through the inlet control valve. The pressure membrane material properties are adjusted to have the desired tire pressure settings.

Figure 13:
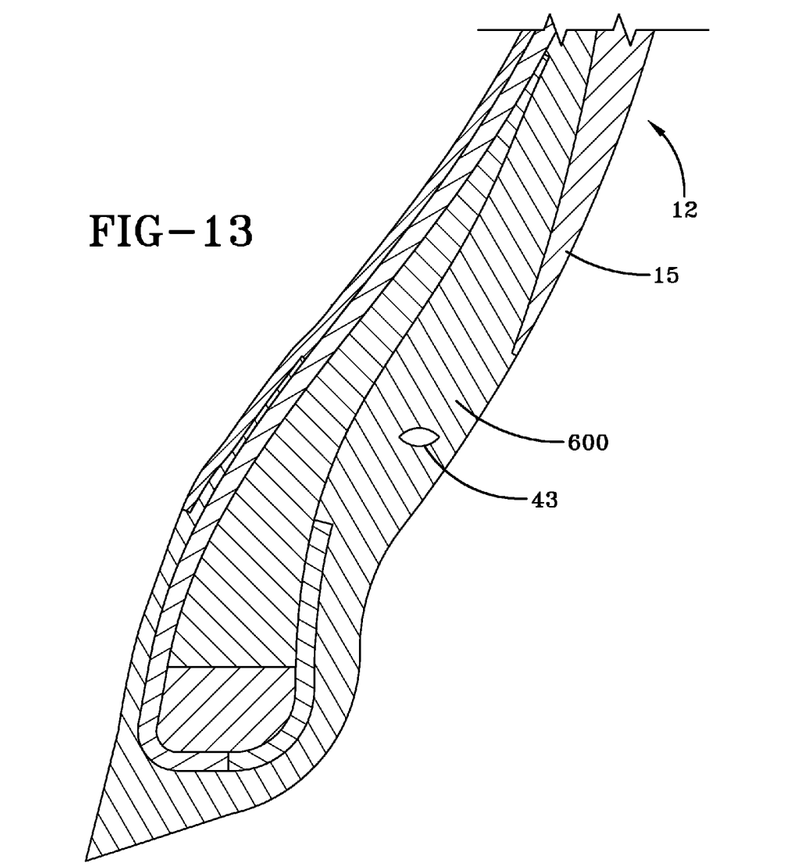
FIG. 13 is a cross-sectional view of the lower tire sidewall.

The location of the pump assembly in the tire will be understood from FIGS. 1 and 13. In one embodiment, the pump assembly 14 is positioned in the tire sidewall, radially outward of the rim flange surface in the chafer 600. So positioned, the air passageway 43 is radially inward from the tire footprint and is thus positioned to be flattened by forces directed from the tire footprint as described above. Although the positioning of the air passageway 43 is specifically shown in a chafer 600 of the tire near the bead region, it is not limited to same, and may be located at any region of the tire that undergoes cyclical compression. The cross-sectional shape of the air passageway 43 may be elliptical or round.

Figure 14:
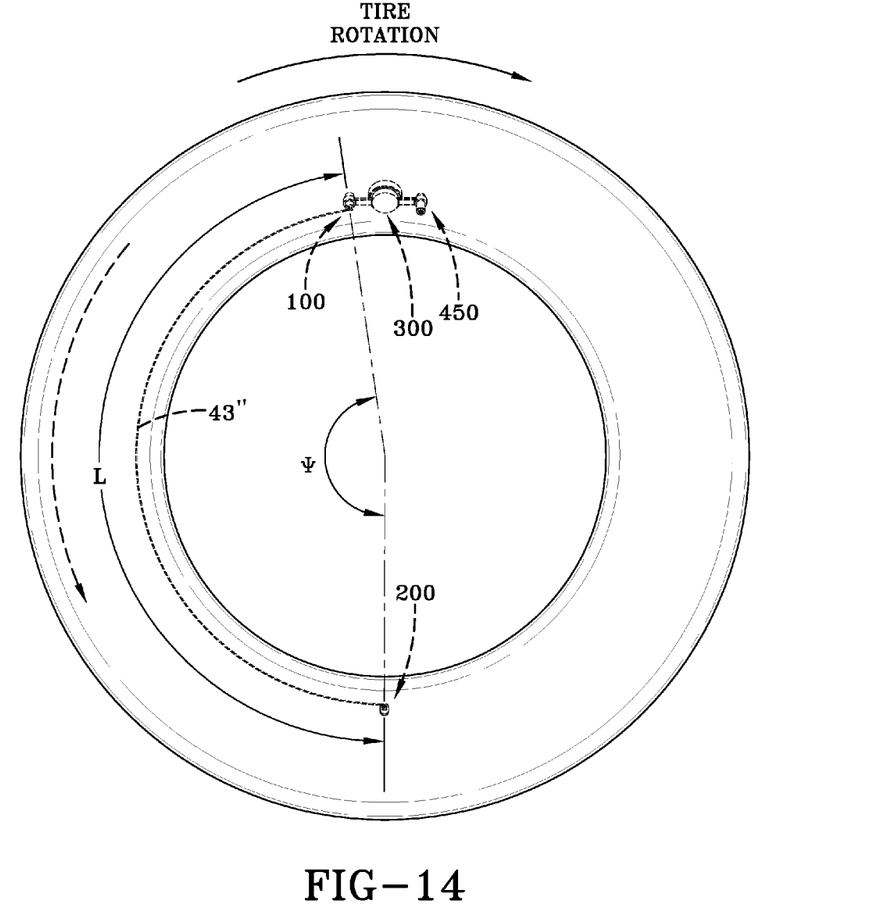
FIG. 14 is a front view of the regulator and pump assembly illustrating a pump length of about 170 degrees.
Figure 15:
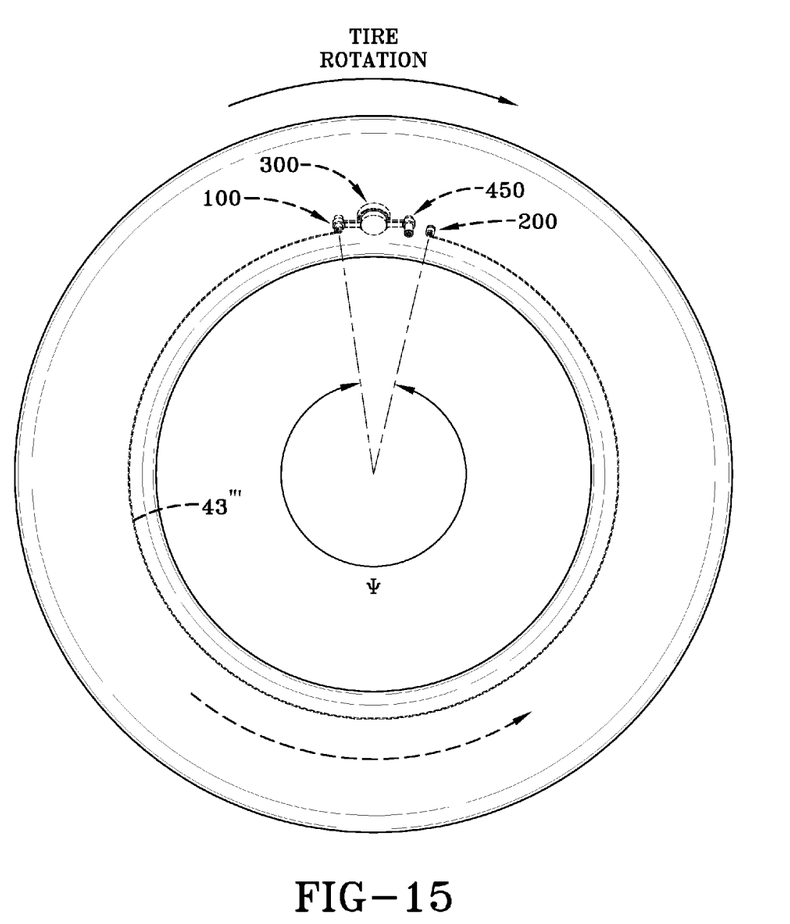
FIG. 15 is a front view of the regulator and pump assembly illustrating a pump length of about 350 degrees.

As described above, the length L of the pump passageway may be about the size of the tire's footprint length Z. However, the invention is not limited to same, and may be shorter or longer as desired. See FIG. 14 which illustrates an approximate 170 degree length, of the air passageway 43", and, FIG. 15 which illustrates an approximate 340 degree length. Of the air passageway 43'". As the length of the pump increases, the pump passageway will need to substantially open and close like a peristaltic pump.

The pump assembly 14 may also be used with a secondary tire pressure monitoring system (TPMS) (not shown) of conventional configuration that serves as a system fault detector. The TPMS may be used to detect any fault in the self-inflation system of the tire assembly and alert the user of such a condition.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A self-inflating tire assembly comprising:
    a tire mounted to a rim, the tire having a tire cavity, first and second sidewalls extending respectively from first and second tire bead regions to a tire tread region;
    an air passageway having an inlet end and an outlet end, the air passageway being composed of a flexible material operative to open and close when the tire rotates, wherein the outlet end is in fluid communication with the tire cavity;
    an inlet control valve having a regulator body having an interior chamber; a pressure membrane being mounted in the inlet control valve to enclose the interior chamber, wherein the pressure membrane has a lower surface that is positioned to open and close an outlet port mounted in the interior chamber, wherein the pressure membrane is in fluid communication with a tire cavity pressure;
    wherein the body of the inlet control valve has a first and second flexible duct, wherein said first and second flexible ducts each have an internal passageway; wherein the first flexible duct has a first end connected to an inlet filter assembly and a second end is connected to the interior chamber of the inlet control valve, wherein the second flexible duct has a first end connected to the outlet port of the inlet control valve, and a second end in fluid communication with the inlet end of the air passageway.

2. The self-inflating tire assembly of claim 1 wherein the air passageway is integrally formed in the sidewall of the tire.

3. The self-inflating tire assembly of claim 1 wherein a spring biases the pressure membrane in an open position.

4. The self-inflating tire assembly of claim 3 wherein the spring is a leaf spring.

5. The self-inflating tire assembly of claim 1, wherein the length of the air passageway is greater than 10 degrees.

6. The self-inflating tire assembly of claim 1, wherein the length of the air passageway is about the same as the length of a tire footprint.

7. The self-inflating tire assembly of claim 1, wherein the length of the air passageway is in the range of about 10 to about 30 degrees.

8. The self-inflating tire assembly of claim 1, wherein the air passageway is substantially elliptical in cross-section.

9. The self-inflating tire assembly of claim 1, wherein the air passageway is positioned in a chafer.

10. The self-inflating tire assembly of claim 1, wherein a first check valve is located between the outlet end of the air passageway and a tire cavity.

11. The self-inflating tire assembly of claim 10 wherein the first check valve has an insert sleeve affixed to one of the first and second sidewalls, wherein the insert sleeve has an internally threaded bore that extends completely therethrough, wherein the internal bore has a first end open to the tire cavity, and a second end connected to the air passageway outlet end, wherein a flexible stopper is received in the internal bore.

12. The self-inflating tire assembly of claim 11 wherein the flexible stopper has a disk shaped lower end that is positioned to open and close the air passageway outlet end.

13. The self-inflating tire assembly of claim 1 wherein the filter assembly has an insert sleeve affixed to one of said first and second sidewalls, wherein the insert sleeve has an internally threaded bore that extends completely therethrough, wherein the internal bore has a first end in the tire cavity and a second end open to the ambient air outside the tire, an air passage screw having an internal passageway is received in the first end of the insert sleeve, a filter is received within the internal passageway of the air passage screw.

* * * * *